United States Patent [19]
Hosch et al.

[11] Patent Number: 5,779,026
[45] Date of Patent: Jul. 14, 1998

[54] APPARATUS FOR SORTING ARTICLES

[75] Inventors: Michael A. Hosch, Oconomowoc; John G. Schwan, III, Milwaukee, both of Wis.

[73] Assignee: Dorner Mfg. Corp., Hartland, Wis.

[21] Appl. No.: 564,620

[22] Filed: Nov. 29, 1995

[51] Int. Cl.[6] ................................................ B65G 15/10
[52] U.S. Cl. .................. 198/817; 198/370.07; 198/367; 209/656; 209/657
[58] Field of Search .................... 198/817, 367, 198/370.07; 209/651, 653, 656, 657, 923

[56] References Cited

U.S. PATENT DOCUMENTS

| | | | |
|---|---|---|---|
| 1,405,233 | 1/1922 | Lemoine | 198/817 |
| 3,631,977 | 1/1972 | Taul | 209/657 |
| 4,643,291 | 2/1987 | Counter et al. | 198/370.07 |
| 4,783,794 | 11/1988 | Dietrich | 198/817 |
| 5,156,260 | 10/1992 | Dorner et al. | |
| 5,203,447 | 4/1993 | Ewert | |
| 5,392,927 | 2/1995 | Haverkamp Begemann et al. | 209/651 |

*Primary Examiner*—William E. Terrell
*Assistant Examiner*—Khoi H. Tran
*Attorney, Agent, or Firm*—Andrus, Sceales, Starke & Sawall

[57] ABSTRACT

An apparatus for sorting articles on a conveyor system that includes a pair of parallel conveyors each having an endless conveyor member or belt. The belt of a first of the conveyors is tilted laterally to the horizontal, and the belt of the second conveyor is located at about 90° with respect to the belt of the first conveyor, thus providing an elongated L-shaped pocket or channel within which articles are conveyed. The lower side edge of the second conveyor belt is spaced from the upper surface of the first conveyor belt to provide a passage therebetween, and a pusher member is mounted for sliding movement within the passage. When directed by a computerized system, the pusher member is actuated to move across the first conveyor belt to engage and eject an article laterally from the first conveyor belt to a collection site.

9 Claims, 3 Drawing Sheets

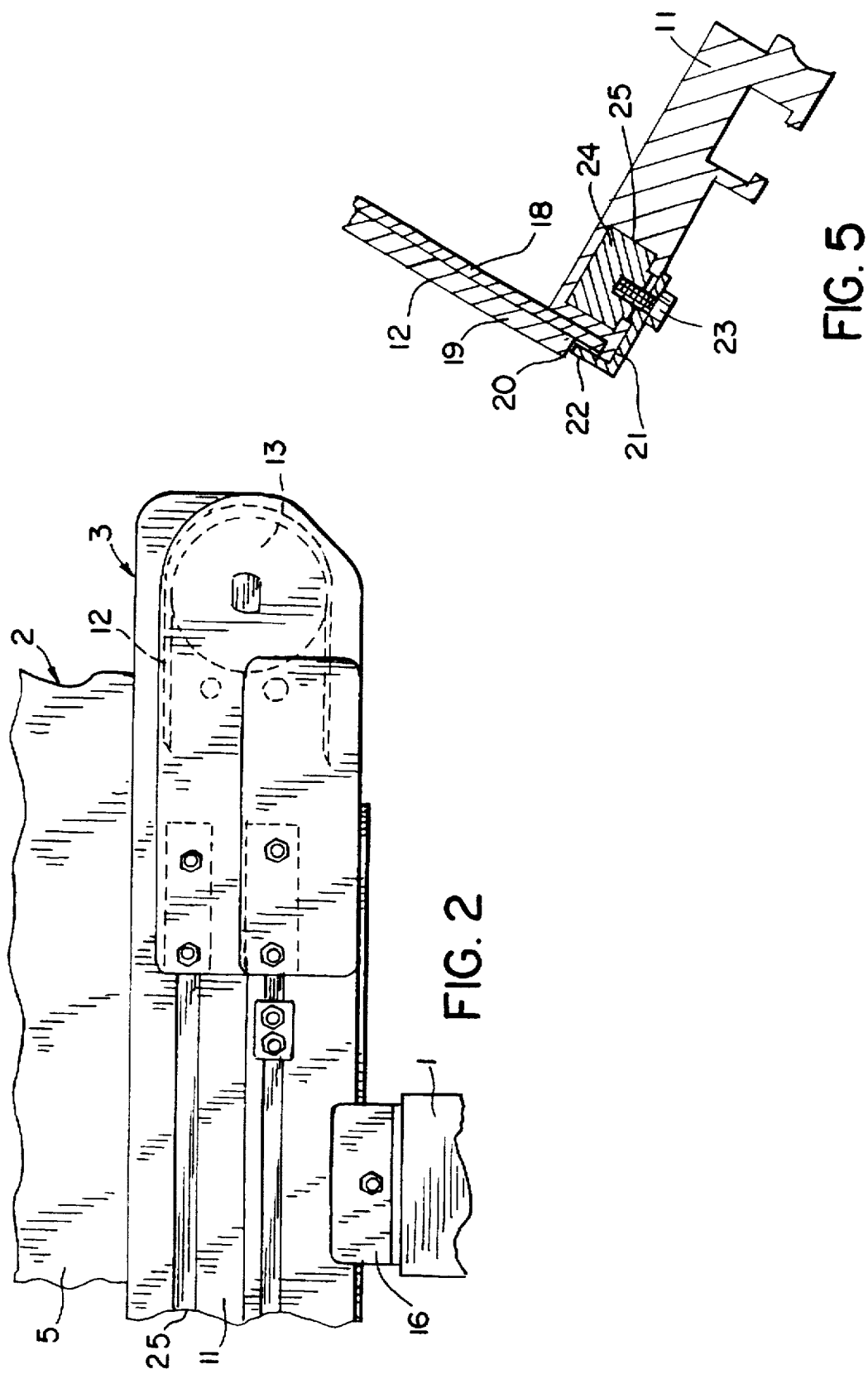

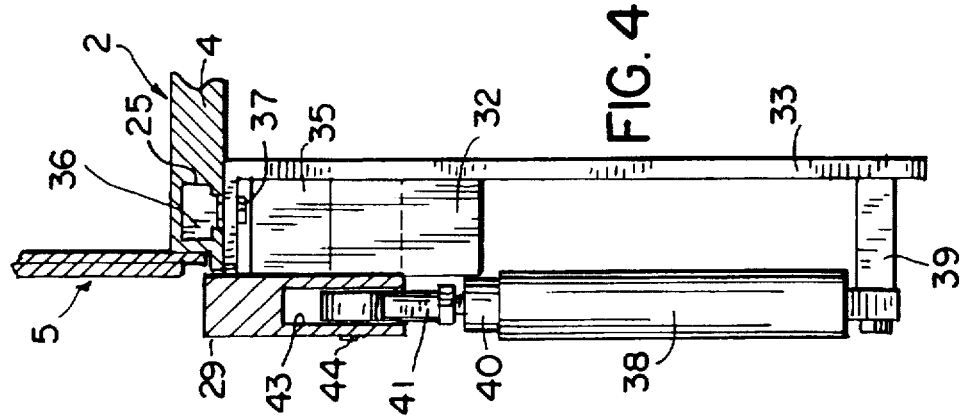
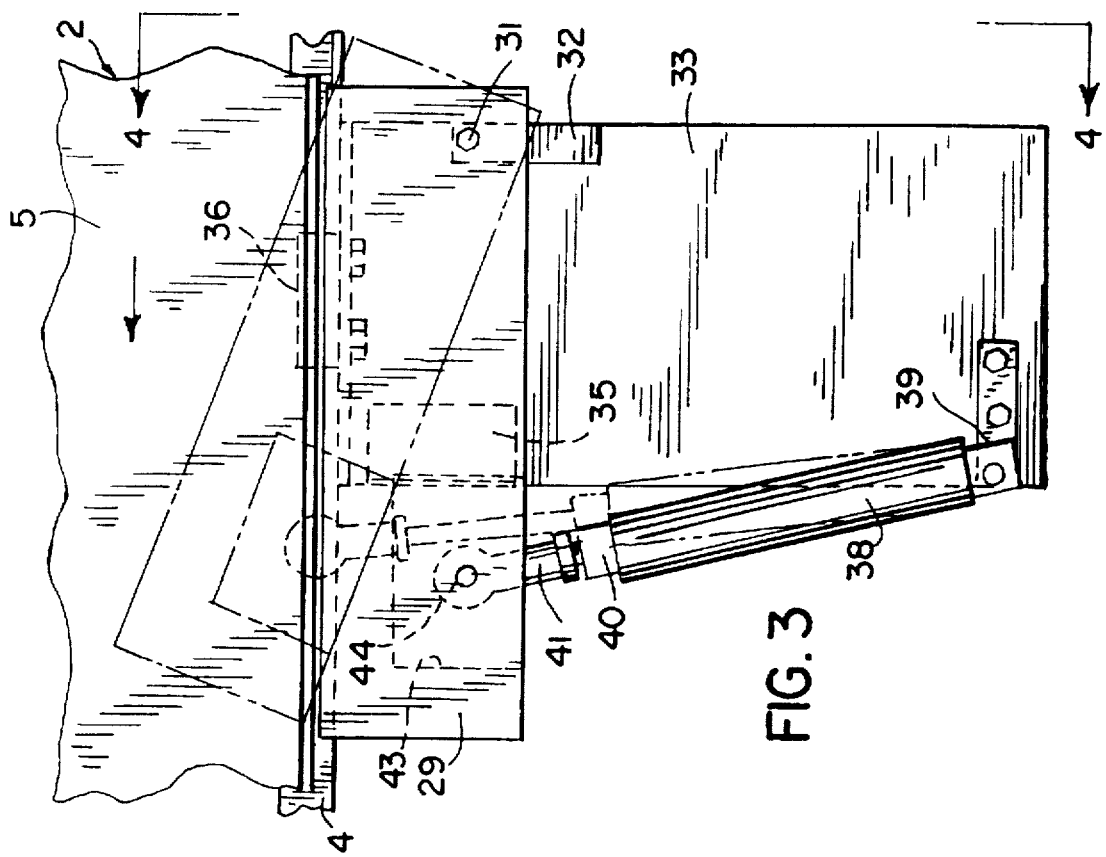

5,779,026

APPARATUS FOR SORTING ARTICLES

BACKGROUND OF THE INVENTION

Automatic sorting systems are frequently utilized with a conveyor to automatically sort and eject articles from the conveyor into bins or other containers for packaging. In a typical conveyor sorting system, a large number of sorting devices are located along the length of the conveyor. As articles moves along the conveyor, the sorting devices are selectively actuated through a computer program to divert or eject articles from the conveyor into containers or bins associated with each sorting device, thus filling a purchase order.

As the typical sorting system may includes a substantial number of sorting devices, it is important that each sorting device be compact in size, in order to reduce the overall length of the conveying system. It is also important that the sorting device have a relatively short stroke of movement in ejecting or diverting the articles from the conveyor. A shorter stroke of movement will reduce the size and cost of the sorting device and enable the conveyor to operate at higher speeds.

In a sorting system it is also desirable to convey small, relatively thin articles, such as video or audio cassettes, in an upright position, rather than in a flatwise position on the conveyor. In an upright position the articles require less lateral displacement for ejecting and can be located closer to each other, thus enabling the sorting devices to be located closer together and decreasing the overall length of the conveyor.

SUMMARY OF THE INVENTION

The invention is directed to an improved apparatus for sorting or diverting articles from a conveyor system. The apparatus includes a pair of parallel conveyors each having an endless conveying member or belt. The conveying belt of a first of the conveyors is tilted laterally, generally at an angle of about 20° to 30° with respect to the horizontal, and the belt of the second conveyor is located at about 90° with respect to the belt of the first conveyor. The two parallel belts thus define an elongated, generally L-shaped pocket or channel within which the articles are conveyed.

In a preferred form of the invention, each of the conveyors is individually driven and the speed of operation of the two conveyor belts is synchronized.

The lower side edge of the second conveyor belt is spaced above the conveying surface of the first belt to provide an elongated gap or passage, and a pusher member or ejector is mounted for sliding movement within the passage between an inoperative position, where the pusher is located in the passage and will not interfere with movement of the articles within the conveying channel, and an operative position where the pusher will move across the first conveyor belt to engage and eject an article laterally from the first conveyor belt. In the preferred form of the invention, the pusher is mounted for pivotal movement within the passage and is moved between the inoperative and operative positions by an air cylinder.

In operation, the articles, such as small paperboard containers, video or audio cassettes, and the like, are conveyed within the L-shaped conveying channel by operation of the two conveyor belts. As an article passes past a sorting station, a computerized program can actuate the pusher to move the pusher across the first conveying belt, thus pushing the article laterally from that conveyor and into a chute for collection in a bin, and subsequent packaging with other ejected articles to fill a purchase order.

As the articles are conveyed in the L-shaped pocket or channel between the two conveyors, the apparatus can accommodate various sized articles without any change or adjustment in configuration of the conveyors.

The sorting mechanism of the invention also provides greater flexibility in feeding the articles to the sorting device. In this regard, the articles can be fed into the L-shaped pocket or channel between the conveyors either by a horizontal in-feed conveyor, or alternately, the articles can be fed from the top or the side.

As a feature of the invention, the location of the sorting devices can be readily adjusted along the length of the conveyors. In this regard, each sorting device includes a slide block that is mounted for sliding movement in a T-shaped slot in the side rail of one of the conveyors. This arrangement enables each sorting device to be readily moved along the length of the conveyor and positioned in any desired location.

Other objects and advantages will appear in the course of the following description.

DESCRIPTION OF THE DRAWINGS

The drawings illustrate the best mode presently contemplated of carrying out the invention.

In the drawings:

FIG. 2 is a view taken along line 2—2 of FIG. 1;

FIG. 3 is a section taken along line 3—3 of FIG. 1;

FIG. 4 is a line taken along line 4—4 of FIG. 3;

FIG. 5 is an enlarged fragmentary section showing the mounting of a conveyor belt to the side rail of a conveyor.

DESCRIPTION OF THE ILLUSTRATED EMBODIMENT

Figure 1:
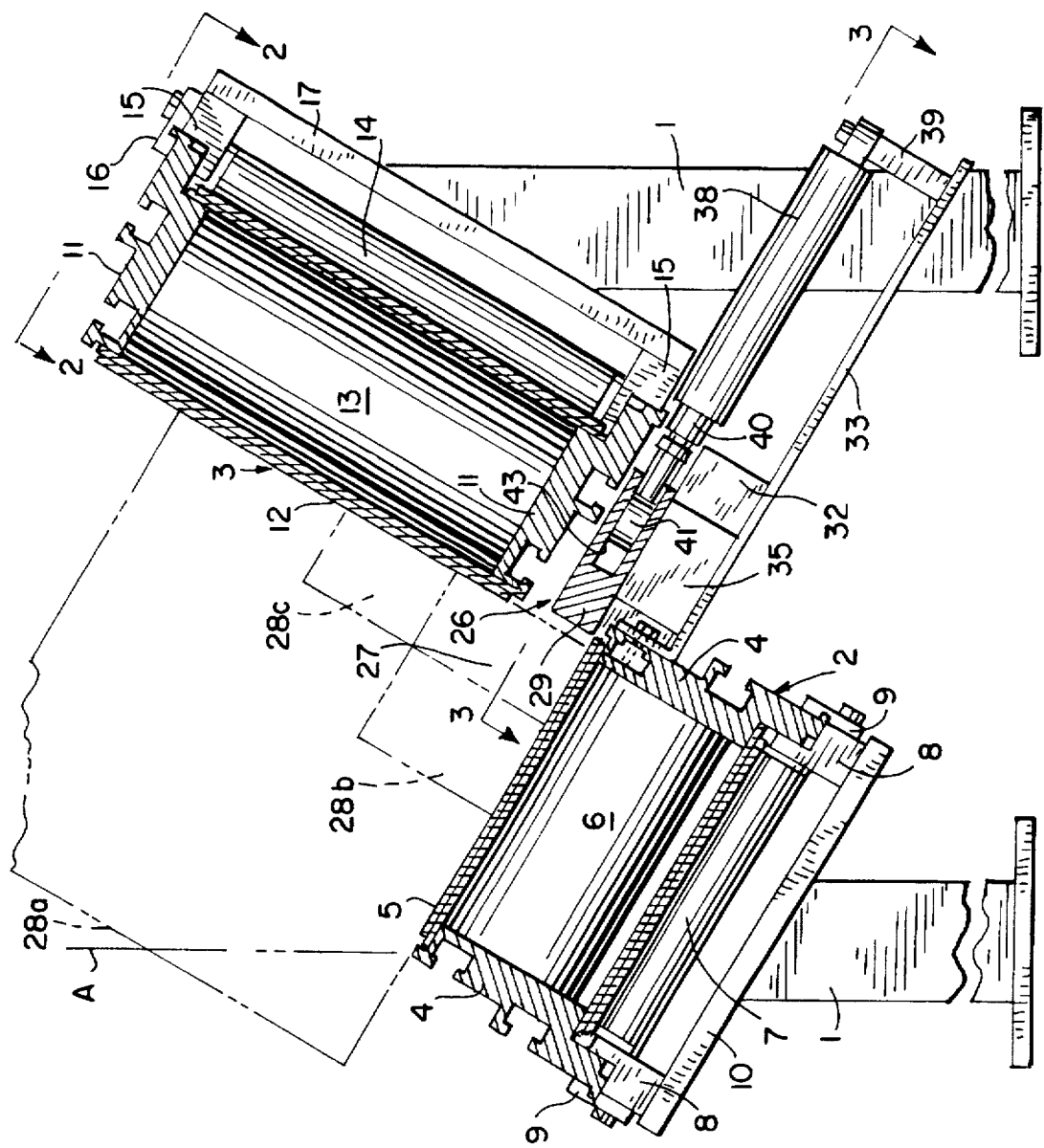
FIG. 1 is a vertical section of the sorting apparatus of the invention.

The drawings illustrate an apparatus for sorting or diverting small articles from a conveyor system. In practice, the articles may take the form of small paperboard boxes, small plastic containers, video or audio cassettes, and the like. The articles are adapted to be moved or ejected laterally from the conveying system into bins or containers for packaging and subsequent shipment to a customer.

The apparatus comprises a frame or supporting structure consisting of a series of upstanding columns 1 that support a pair of conveyors 2 and 3.

Conveyor 2 is a conventional type and can be constructed as shown in U.S. Pat. No. 5,156,260. Conveyor 2 includes a pair of generally parallel side rails 4 and an endless non-cleated belt 5 is mounted for endless travel on a pair of spindles or pulleys 6 which are located at the ends of the conveyor. In addition, the return run of the belt is supported by a series of rollers 7 that extend between the side rails 4, and the number of rollers 7 is determined by the length of the conveyor.

Each roller 7 is journaled in bearing blocks 8, and blocks 8 are connected to the lower edge of each side rail 4 through connecting bars 9. An inclined mounting plate 10 is secured to blocks 8 and is mounted on the columns 1. As shown in FIG. 1, this mounting arrangement positions the conveying run of belt 5 at an acute angle to the horizontal and preferably at an angle of about 20° to 30° with respect to the horizontal.

Belt 5 can be driven in an endless path by a drive mechanism, as shown in U.S. Pat. No. 5,203,447.

Conveyor 3 is similar in construction to conveyor 2 and, as previously noted, can be fabricated in the manner shown in U.S. Pat. No. 5,156,260. Conveyor 3 includes a pair of parallel side rails 11 and a conveyor belt 12 is mounted for endless travel on a pair of spindles or pulleys 13, which are journaled between side rails 11. In addition, the return run of belt 12 can be guided by one or more rollers 14 which extend between side rails 11.

Belt 12 can be driven by a drive mechanism as shown in U.S. Pat. No. 5,203,447, and it is preferred that the drive mechanism for belt 12 be synchronized with the drive for belt 5, so that both belts will travel at the same speed.

Conveyor 3 is supported from the columns 1 in the same manner as described with respect to conveyor 2. Rollers 14 are journaled in bearing blocks 15, and the blocks are connected to the lower edges of side rails 11 through connecting bars 16. An inclined mounting plate 17, similar to plate 10, is secured to the blocks 15, and is connected to columns 1 of the supporting frame.

As illustrated in FIG. 2, the conveying run of belt 12 is located at about 90° with respect to the conveying run of belt 5, and the two belts define a conveying pocket or channel within which articles are conveyed.

To facilitate guiding of belt 12, the belt is formed with an inner layer or carcass 18 of fabric material, as illustrated in FIG. 5, and an outer layer of plastic material 19. The lower side edge of carcass 18 extends laterally beyond the side edge of the layer 19, thus providing a step 20. As best shown in FIG. 5, the side edge of the carcass 18 rides against the upper edge 21 of side rail 11. A generally L-shaped clip 22 is mounted to the upper edge of the side rail by bolts 23 which are connected to a slide block 24 that is slidable within an elongated T-slot 25 formed in side rail 11. As illustrated in FIG. 5, the lower edge of layer 19 of belt 12, which is relatively soft or elastomeric material, is spaced from the edge of clip 22, so that the softer outer layer 19 will not ride against a fixed member during movement of the belt.

As shown in FIG. 2, the lower side rail 11 of conveyor 3 is spaced upwardly from the belt 5 of conveyor 2 to provide an elongated passage or gap 26 between the two conveyors. As illustrated, the conveyor 3 partially overlaps the conveyor 2, but this overlapping arrangement is not critical. The two belts 5 and 12 of the conveyors 2 and 3 define an elongated generally L-shaped pocket or channel 27 within which the articles are conveyed. Due to the configuration of channel 27, articles 28 of various configurations can be conveyed without any change or adjustment in configuration of the conveyors 2 and 3. As illustrated in FIG. 1, the articles 28 may take the form of articles 28a or 28b, which overhangs the conveyor 2, or articles 28c which do not overhang conveyor 2. It is important that the center of gravity of the article 28 be located inwardly from plane A, as shown in FIG. 1, so that the article will be retained by gravity within the L-shaped pocket or channel 27.

In a typical sorting system, a large number of sorting devices are located along the length of conveyors 2 and 3, and the drawings illustrate only a single sorting device. Each sorting device includes a mechanism to selectively push or eject the articles 28 from the conveying channel 27. The pushing mechanism, as illustrated, takes the form of a generally rectangular pusher plate 29, which is located in the passage 26. In a preferred form of the invention, one end of pusher plate 29 is pivoted through pin 31 to a block 32 which extends outwardly from support plate 33. In addition, guide block 35 formed of nylon, or the like, is mounted on support plate 33 and serves to support the pusher 29 in pivoting movement.

As a feature of the invention, the support plate 33 carries a slide bar 36 which is mounted for adjustable movement in T-shaped slot 25 in side rail 4. By threading bolts 37 into bar 36, the bar will be drawn outwardly against the lips bordering T-slot 25 to lock the bar 36 and plate 33 relative to side rail 4. See FIG. 4. This connection permits the entire sorting device to be moved longitudinally along the side rail 4, to thereby selectively locate the pusher 29 at any desired location.

The pusher 29 is movable between an inoperative position, where it is wholly within the passage 26, to an operative position where it moves across the belt 5 and can engage an article 28 on the belt, thereby pushing the article laterally from the conveyor 2. To actuate pusher 29 a fluid cylinder, such as air cylinder 38, is utilized. One end of cylinder 38 is pivotally connected to a lug 39 extending outwardly from plate 33, while a piston rod 40 projects from the opposite end of cylinder 38 and carries a clevis 41 that is located within an internal slot 43 in pusher 29. The clevis 41 is connected to pusher 29 through a pin 44. With this construction, operation of the cylinder 38 will extend piston rod 40 causing the pusher 29 to pivot out of the passage 26 across the conveying run of belt 5, thereby pushing the article 28 laterally from the conveyor. In practice, a chute may be attached to the side of conveyor 2 at the location of the pusher 29, and the article being ejected from the conveyor can then move down the chute into a collection bin or container.

In operation, a multiplicity of articles 28, each having a bar code designation, are conveyed in the channel 27. The articles pass beneath a bar code reader, and through a computer program, the sorting devices are selectively operated to push or eject designated articles laterally from the conveyor belt 5, and the ejected article then travels down a chute to a collection bin or site where it is combined with other articles to fill a purchase order for a customer.

As the articles 28 are conveyed in the generally L-shaped channel or pocket 27, articles of various size and shape can be accommodated without any adjustment or modification of the conveyors 2 and 3.

The belts 5 and 12 are preferably non-cleated, and thus articles can be deposited on the belts at any intervals without the need for accurately positioning articles within pocket as is necessary with a cleated conveyor. The articles can be fed to the conveying channel 27 by various mechanisms, such as in-line horizontal conveyors, lateral conveyors, or the like.

We claim:

1. A sorting apparatus for sorting articles on a conveyor system, comprising a first conveyor having a first conveyor member, said first conveyor being tilted laterally so that said first conveyor member is disposed at an acute angle to the horizontal, said first conveyor member having an upper side edge and a lower side edge, a second conveyor disposed parallel to said first conveyor and having a second conveyor member disposed at an angle of about 90° to said first conveyor member, said second conveyor member having an upper side edge and a lower side edge, the lower side edge of said second conveyor member being spaced above said first conveyor member to define a space therebetween, said first conveyor member and said second conveyor member defining a generally L-shaped channel to receive articles to be conveyed, drive means for driving said first and second conveyors, and pusher means disposed to move in said space to engage and push an article laterally from said first conveyor member.

2. The apparatus of claim 1, wherein said first conveyor member is located at an angle of about 20° to 30° from the horizontal.

3. The apparatus of claim 1, wherein said pusher means comprises a pusher member mounted for movement in the space and having an inoperative position where said pusher member is located wholly within said space and an operative position where said pusher member is located above said first conveyor member, said pusher means also including actuating means for moving the pusher member between the inoperative position and the operative position.

4. The apparatus of claim 3, wherein said pusher member is mounted for pivotal movement relative to said conveyors.

5. A sorting apparatus for a conveyor system, comprising a first conveyor having a first endless conveyor belt tilted laterally so that said first belt is disposed at an acute angle to the horizontal, said first belt having an upper side edge and a lower side edge, a second conveyor disposed at a level above said first conveyor and disposed parallel to said first conveyor, said second conveyor having a second endless conveyor belt disposed at an angle of about 90° with respect to said first belt, said second belt having an upper side edge and a lower side edge, the lower side edge of said second belt being spaced above said first belt to define an inclined passage, said first belt and said second belt defining a generally L-shaped elongated channel to receive articles to be conveyed, drive means for driving said first and second belts, and an ejector member mounted for sliding movement within said passage from an inoperative position where said ejector member is located within said passage and an operative position where said ejector member is located above said first belt, and actuating means for moving said ejector member between the inoperative and operative positions, movement of said ejector member to the operative position acting to push an article laterally from said first belt to a collection site.

6. The apparatus of claim 5, and including pivot means for pivoting said ejector member to one of said conveyors.

7. The apparatus of claim 5, wherein said second conveyor includes a pair of spaced side rails to support said second belt in movement, said second belt having a fabric carcass and an outer plastic layer, a lower side edge of said carcass extending laterally beyond the corresponding side edge of said layer and said side edge of the carcass disposed in sliding engagement with a side rail.

8. The apparatus of claim 1, and including means for adjustably mounting said pusher means relative to said second conveyor.

9. The apparatus of claim 8, wherein said second conveyor includes a side rail having an elongated slot, said pusher means having a slide block mounted for sliding movement in said slot, said slide block in combination with said slot comprising said adjusting means.

* * * * *